United States Patent [19]
Nihei

[11] Patent Number: 4,813,643
[45] Date of Patent: Mar. 21, 1989

[54] AUTOMOTIVE SEAT SLIDE DEVICE

[75] Inventor: Masao Nihei, Yokohama, Japan

[73] Assignee: Ohi Seisakusho Co., Ltd., Yokohama, Japan

[21] Appl. No.: 102,413

[22] Filed: Sep. 29, 1987

[30] Foreign Application Priority Data

Oct. 7, 1986 [JP] Japan .................. 61-153826[U]

[51] Int. Cl.[4] .................. F16M 13/00; A47C 1/00
[52] U.S. Cl. .................... 248/430; 248/393; 248/419; 297/346
[58] Field of Search ............ 248/430, 393, 419, 420, 248/429, 424, 1 E; 297/346, 329

[56] References Cited

U.S. PATENT DOCUMENTS

| | | | |
|---|---|---|---|
| 4,204,658 | 5/1980 | Courtois | 248/430 |
| 4,526,424 | 7/1985 | Korth | 248/430 X |
| 4,572,469 | 2/1986 | Rees | 248/430 |
| 4,580,755 | 4/1986 | Rees | 248/424 X |
| 4,629,254 | 12/1986 | Stolper et al. | 248/430 X |
| 4,660,795 | 4/1987 | Ikegaya et al. | 248/430 |
| 4,730,804 | 3/1988 | Higuchi et al. | 248/429 |

Primary Examiner—Ramon S. Britts
Assistant Examiner—Karen J. Chotkowski
Attorney, Agent, or Firm—Foley & Lardner, Schwartz, Jeffery, Schwaab, Mack, Blumenthal & Evans

[57] ABSTRACT

A lock plate having a plurality of latch holes is connected to a stationary lower rail to extend along the same, and a latch member having latch pawls is fixed to a control rod which is rotatably held by a movable upper rail. One of the latch pawls is longer than the other, so that when the upper rail is slid to a front or rear over-travel position relative to the lower rail, the longer latch pawl is placed outside of an extreme end of the lock plate having the other shorter latch pawl placed on a land portion of the lock plate. Upon application of shock to the upper rail due to for example rapid start or rapid braking of the vehicle, the longer pawl is brought into contact with the extreme end of the lock plate faclitating latched engagement between the shorter pawl and an adjacent latch hole of the lock plate.

10 Claims, 3 Drawing Sheets

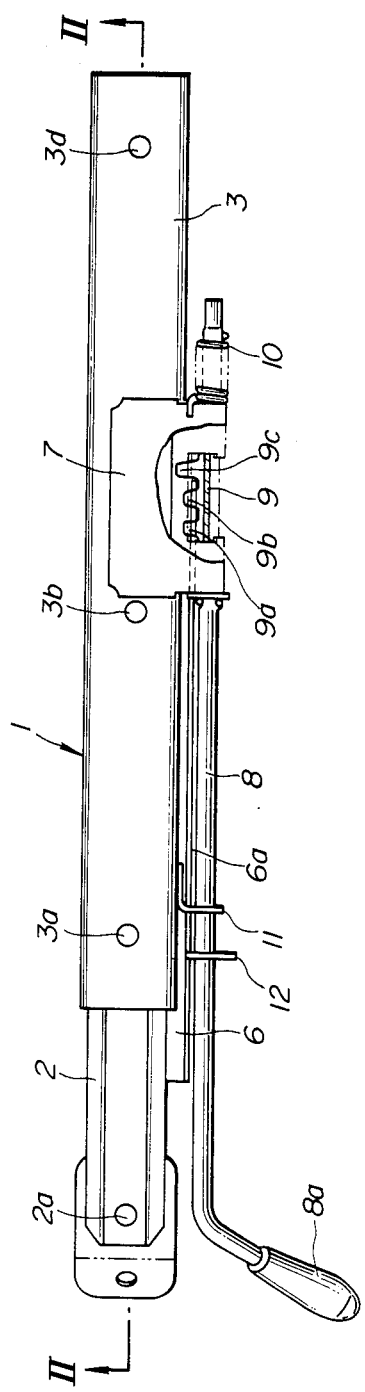

F1 ←
F2 →

AUTOMOTIVE SEAT SLIDE DEVICE

BACKGROUND OF THE INVENTION

1. Field of the Invention

The present invention relates in general to automotive seat slide devices which move an automotive seat in a fore-and-aft direction and lock the same at a desired position, and more particularly to seat slide devices of a type which can prevent a dangerous position skip phenomenon of the seat which would occur when the seat is at an over-travel position.

2. Description of the Prior Art

One of the conventional seat slide devices of the above-mentioned type is disclosed in Japanese Patent First Provisional Publication No. 61-169340.

In the device diclosed in the publication, a latch member pivotally connected to an upper rail (viz., a movable rail fixed to a seat) is formed with two or three latch pawls which are latchingly engageable with latch holes formed in a side wall of a lower rail (viz., a stationary rail fixed to a vehicle floor). One of the latch pawls is formed longer and thinner than the other or others, so that when the seat comes to an over-travel position (viz., an abnormal extreme position where normal latching between the latch member and the latch holes fails to be established), at least the longer and thinner latch pawl establishes a latching engagement with an outermost hole of the latch holes. Thus, even when the associated vehicle is subjected to a rapid start or rapid braking, the seat at the over travel position is prevented from skidding rearwardly or forward.

However, due to inevitable errors in assembling the device, it sometimes occurs that even when the seat assumes the over travel position, not only the shorter latch pawl or pawls but also the longer latch pawl fails to establish a latching engagement with the associated latch hole, as is seen from FIG. 10. That is, the longer latch pawl (A) rides on a land portion of the side wall (C) disengaging from the outermost latch hole (B). Thus, under this condition, latching engagement is not established between the upper and lower rails, so that a dangerous seat skidding or position skip phenomenon tends to occur upon a rapid start or rapid braking of the vehicle.

One of measures for solving this dangerous matter is to increase the size or the width (L) of the outermost latch hole (B). This measure increases the chance of establishing the engagement between the longer and thinner latch pawl (A) and the hole (B).

However, as is known, formation of an enlarged hole in the side wall of the lower rail lowers the mechanical strength of the same.

SUMMARY OF THE INVENTION

It is therefore an object of the present invention to provide an automotive seat slide device which is free of the above-mentioned drawbacks.

According to the present invention, there is provided an automotive seat slide device which can prevent a position skip phenomenon of the seat even when the seat is at the over-travel position upon a rapid start of rapid braking of the associated vehicle.

According to the present invention, there is provided a seat slide device for sliding a seat relative to a floor, which comprises a lower rail secured to the floor; an upper rail secured to the seat and slidably disposed on the lower rail; a structure means for allowing the upper rail to assume an abnormal axially outermost position relative to the lower rail, the abnormal axially outermost position being outside of a normal axially outermost position of the upper rail; a lock plate formed with a plurality of aligned latch holes and secured to the lower rail in such a manner that the latch holes are aligned along the sliding direction of the upper rail; and a latch member movably connected to said upper rail, the latch member being formed with at least two latch pawls which are latchingly engageable with the latch holes of the lock plate when the upper rail assumes a position other than the abnormal and normal axially outermost positions; wherein one of the latch pawls is longer than the other, so that when the upper rail is slid into the abnormal axially outermost position, the longer latch pawl is placed outside of the extreme end of the lock plate having the shorter latch pawl placed on a land portion of the lock plate.

BRIEF DESCRIPTION OF THE DRAWINGS

FIGS. 1 to 9 show an automotive seat slide device of an embodiment of the present invention, in which:

FIG. 1 is a plan view of the seat slide device of the invention;

FIG. 2 is a sectional view taken along the line II—II of FIG. 1;

FIGS. 3 to 5 are enlarged sectional views of an essential part of the seat slide device of the invention, showing various conditions taken by a latch member and a lock plate;

FIGS. 6 to 8 are sectional views of another essential part of the seat slide device, showing various conditions taken by stoppers;

FIG. 9 is a perspective view of the seat slide device of the present invention.

DETAILED DESCRIPTION OF THE INVENTION

Figure 9:
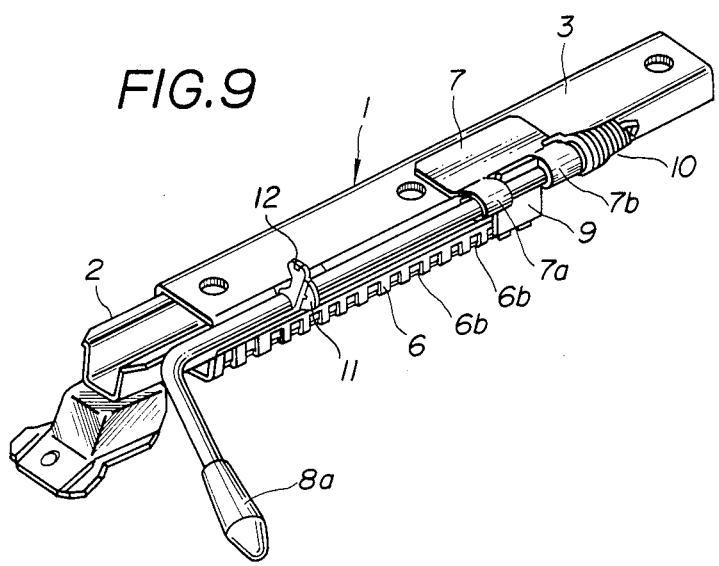
Figure 10:
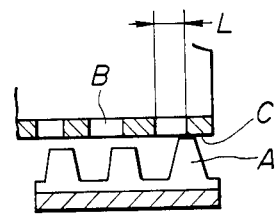
FIG. 10 is a sectional view similar to FIG. 4, but showing a latch member and a lock plate which are employed in the afore-mentioned conventional seat slide device.

Referring to FIGS. 1, 2 and 9, particularly FIG. 9, there is shown a seat slide device of the present invention, which is generally designated by reference 1. In practice, another seat slide device (not shown) having a similar construction to the device 1 is arranged beside the same, and a seat (not shown) is mounted on these two slide devices for achieving forward and rearward movements relative to a vehicle floor (not shown) on which the slide devices are mounted. Since these two seat slide devices have substantially the same construction, one of them, viz.,the device 1 illustrated by the drawings will be described in detail in the following. For ease of understanding, the device 1 shown by the drawings will be designated as "right-positioned seat slide device", while, the device which is not shown will be designated as "left-positioned seat slide device".

The right-positioned seat slide device 1 comprises a lower rail 2 secured to the vehicle floor, and an upper rail 3 slidably disposed on the lower rail 2 and secured to a bottom of the seat.

The lower rail 2 is of a channel member which comprises flanged side walls and a bottom wall, and the upper rail 3 is also of a channel member which comprises flanged side walls and an upper wall. The flanges of the lower rail 2 extend outward, while those of the upper rail 3 extend inward, so that, as is seen from FIG. 9, the upper rail 3 generally embraces the lower rail 2.

As is seen from FIG. 2, the bottom wall of the lower rail 2 is formed with upward projections 2a, 2b, 2c and 2d, and the upper wall of the upper rail 3 is formed with downward projections 3a, 3b, 3c and 3d. It is to be noted that the distances between the projections 2a and 2b, between the projections 2c and 2d, between the projections 3a and 3b and between the projections 3c and 3d are all equal to one another.

Two rollers 4 and 5 are rotatably disposed between the lower and upper rails 2 and 3. As is understood from FIG. 2, the roller 4 is rotatable within a range which is defined by the projections 2a and 2b of the lower rail 2 and the projections 3a and 3b of the upper rail 3, while the other roller 5 is rotatable within a range which is defined by the projections 2c and 2d of the lower rail 2 and the projections 3c and 3d of the upper rail 3.

Thus, it will be appreciated that the upper rail 3 is slidable between its extremely foremost position, viz., front over-travel position wherein the projections 3b and 3d thereof press strongly the rollers 4 and 5 against the projections 2a and 2c of the lower rail 2 respectively and its extremely rearmost position, viz., a rear over-travel position wherein the projections 3a and 3c thereof press strongly the rollers 4 and 5 against the projections 2b and 2d of the lower rail 2 respectively. The rear over-travel position will be understood from FIG. 7.

As is best seen from FIG. 9, the lower rail 2 is provided with a lock plate 6 which has a generally L-shaped cross section and extends along the rail 2. The vertical wall part of the lock plate 6 is formed with a plurality of equally spaced latch holes 6b which are aligned along the axis of the lower rail 2.

A bracket 7 is secured to the upper wall of the upper rail 3, which has two spaced curled portions 7a and 7b for rotatably supporting a control rod 8. The forward portion of the rod 8 is bent to form a handle 8a. In order to assure the rotatable supporting of the control rod 8 to the upper rail 3, an auxiliary bracket 11 is secured to the upper rail 3 and rotatably holds a part of the control rod 8. Designated by numeral 12 is an arm which is secured to the control rod 8 to rotate therewith. Although not shown in the drawing, a wire is fixed to the arm 12 and extends to a corresponding part of the left-positioned seat slide device (not shown) to transmit the movement of the control rod 8 to the corresponding part.

A latch member 9 of generally L-shaped cross section is fixed to the control rod 8 at the position between the curled portions 7a and 7b of the bracket 7. As is seen from FIG. 1, the inwardly bent part of the latch member 9 is formed with three latch pawls 9a, 9b and 9c which have the same pitch as the latch holes 6b of the lock plate 6.

As is seen from FIG. 1, the outermost or rearmost pawl 9c of the latch member 9 is shaped longer than the other two 9 and 9b for the purpose which will be clarified hereinafter.

Figure 3:
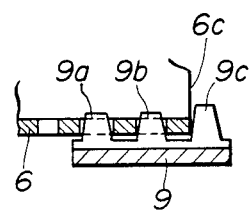
Figure 6:
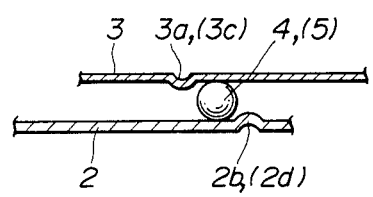
Figure 5:
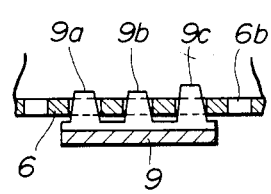
Figure 8:
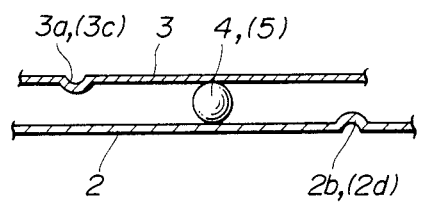

It is to be noted that when, as is depicted by FIG. 8, the seat assumes a normal position other than the aforementioned over-travel positions, the three latch pawls 9a, 9b and 9c are selectively engageable with any adjacent three latch holes 6b of the lock plate 6 in a manner as depicted by FIG. 5. While, when, as is depicted by FIG. 6, the seat assumes its normal rearmost position, the inside latch pawls 9a and 9b of the latch member 9 are engaged with the outside latch holes 6b having the longer latch pawl 9c placed outside of a rear end 6c of the lock plate 6, as is depicted by FIG. 3.

Figure 4:
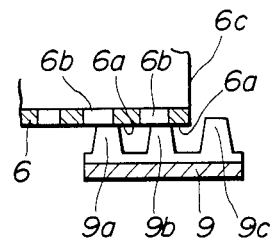
Figure 7:
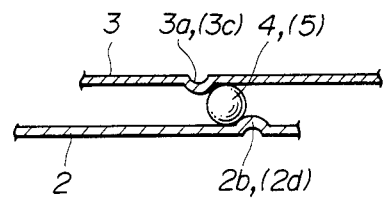

When, however, as is depicted by FIG. 7, the seat comes to the rear over-travel position wherein the projections 3a and 3c of the upper rail 3 press strongly the rollers 4 and 5 against the projections 2b and 2d, the latch member 9 comes to its extremely rearmost position where the three latch pawls 9a, 9b and 9c are disengaged from the latch holes 6b of the lock plate 6, as is seen from FIG. 4. It is to be noted that in this condition, the tops of the shorter latch pawls 9a and 9b are in contact with lands 6a of the lock plate 6, causing the top of the longer latch pawl 9c to somewhat project toward the lower rail 2 beyond a plane P which includes the outer surface of the lock plate 6.

Referring back to FIG. 9, a coiled spring 10 is disposed about a rear portion of the control rod 8 having one end hooked to the bracket 7 and the other end fixed to the control rod 8. With this spring 10, the control rod 8 and thus the latch member 9 is biased toward the lock plate 6, that is, in a direction to establish latching engagement between the latch pawls 9a, 9b and 9c and the latch holes 6b of the lock plate 6.

The left-positioned seat slide device will now be described. Similar to the above-mentioned right-positioned one, a lock plate with latch holes, a latch member with three latch pawls, and a control rod are assembled in the left-positioned seat slide device in substantially the same manner as the right-positioned with one exception.

That is, in the left-positioned seat slide device, the latch member is fixed to a forward end of the control rod, and the foremost pawl of the three latch pawls is formed longer than the other two. Thus, when the seat comes to its front over-travel position wherein the projections 3a and 3d of the upper rail 3 press strongly the rollers 4 and 5 against the projetions 2a and 2c of the lower rail 2, the latch member comes to its foremost disengaged position wherein the tops of the two inside shorter pawls of the latch member are in contact with the lands of the lock plate having the foremost longer pawl placed outside of the foremost end of the lock plate. Similar to the case depicted by FIG. 4, under this condition, the top of the longer pawl is projected toward the lower rail beyond an imaginary plate which corresponds to the plane P of FIG. 4. The control rod has an arm to which the wire from the arm 12 (see FIG. 9) of the right-positioned seat slide device is connected for achieving a simultaneous movement with the control rod 8.

In the following, operation of the seat slide device 1 of the present invention will be described with reference to the drawings.

For ease of understanding, the description will be commenced with respect to a condition wherein the seat is in a normal position defined between the normal foremost position of the upper rail 3 and the normal rearmost position of the same (depicted by FIG. 6). Under this condition, the three latch pawls 9a, 9b and 9c of the latch member 9 are latchingly engaged with three adjacent lock holes 6b of the lock plate 6. Similar engagement is also effected in the left-positioned seat slide device. Thus, the upper rail 3 is latched to the lower rail 2 thereby locking the seat relative to the vehicle floor.

When the handle 8a is turned in a counterclockwise direction in FIG. 9 against the biasing force of the spring 10, the latched engagement between the latch member 9 and the lock plate 6 is cancelled. Similar cancellation takes place in the left-positioned seat slide device due to the simultaneous action of the movement transmitting wire (not shown). Thus, with the handle 8a being kept turned, the seat is pushed rearward, and the same is slid into its rear over-travel position causing the latch member 9 to assume the rearmost disengaged position as shown in FIG. 4.

When, under this condition, the vehicle is subjected to a rapid braking, an inertia force is applied to the seat to push the same forward. The longer pawl 9c of the latch member 9 is brought into abutment with the rear end 6c of the lock plate 6 and then the other two shorter pawls 9a and 9b fall into the adjacent latch holes 6b of the lock plate 6 permitting the longer pawl 9c to slide inwardly along the rear end 6c of the lock plate 6, as is seen from FIG. 3. With this, latched engagement between the upper rail 3 and the lower rail 2 is established at the normal rearmost position of the seat. It is to be noted that the abutment of the longer pawl 9c against the rear end 6c of the lock plate 6 brings about a coincidence between each shorter pawl 9a or 9b and the corresponding latch hole 6b and thus the latching engagement therebetween is instantly and assuredly carried out.

When, on the contrary, the seat is slid to its front over-travel position, the latch member of the left-positioned seat slide device assumes the foremost disengaged position wherein the two inside shorter pawls are disengaged from the corresponding latch holes of the lock plate having the foremost longer pawl placed outside of the front end of the lock plate. When, due to rapid start of the vehicle or the like, an inertial force is applied to the seat in a direction to move the same rearward, the foremost longer pawl of the latch member is brought into abutment with the front end of the lock plate and then the two inside shorter pawls fall into the corresponding latch holes of the lock plate thereby establishing latched engagement between the upper rail 3 and the lower rail 2 at the normal foremost position of the seat. This engagement is instantly and assuredly effected for the same reasons as that described above.

As will be understood from the foregoing description, in the present invention, the following advantages are provided.

First, even when the seat is in its front or rear over-travel position, subsequent latched engagement between the upper rail and the lower rail is instantly and assuredly carried out when a shock caused by rapid braking or rapid start of the associated vehicle is applied to the seat. Thus, the undesired position skip phenomenon is assuredly prevented.

Second, since there is no need for forming a larger latch hole in the lock plate, deterioration in mechanical strength of the same is eliminated or at least minimized. Furthermore, formation of no larger latch hole brings about reduction in length of the lock plate thereby saving the material and lowering the production cost of the seat slide device.

What is claimed is:

1. A seat slide device for sliding a seat relative to a floor, comprising:
   a lower rail;
   an upper rail mounted on said lower rail;
   means for permitting said upper rail to slide relative to said lower rail;
   a structure means for allowing said upper rail to assume an axially outermost position relative to said lower rail, said axially outermost position being outside of a normal axially outermost position to said upper rail;
   a lock plate formed with a plurality of aligned latch holes and secured to said lower rail in such a manner that the latch holes are aligned in a sliding direction of said upper rail;
   a latch member connected to said upper rail, said latch member being formed with one longer latch pawl and at least one relatively shorter latch pawl which are latchingly engageable with the latch holes of said lock plate when said upper rail assumes a position other than said axially outermost and normal axially outermost positions; and
   means for permitting said latch member to move relative to said upper rail;
   wherein when said upper rail is slid into said axially outermost position, the longer latch pawl is placed outside of an extreme and of said lock plate having the shorter latch pawl placed on a land portion of said lock plate.

2. A seat slide device as claimed in claim 1, further comprising a control rod held by said upper rail in a manner to be rotatable about its axis, said latch member being fixed to said control rod to rotate therewith.

3. A seat slide device for sliding a seat relative to a floor, comprising:
   a lower rail,
   an upper rail mounted on said lower rail;
   means for permitting said upper rail to slide relative to said lower rail;
   a structure means for allowing said upper rail to assume an axially outermost position relative to said lower rail, said axially outermost position being outside of a normal axially outermost position of said upper rail;
   a lock plate formed with a plurality of aligned latch holes and secured to said lower rail in such a manner that the latch holes are aligned in a sliding direction of said upper rail;
   a latch member connected to said upper rail, said latch member being formed with one longer latch pawl and at least one relatively shorter latch pawl which are latchingly engageable with the latch holes of said lock plate when said upper rail assumes a position other than said axially outermost and normal axially outermost positions;
   means for permitting said latch member to move relative to said upper rail; and
   a control rod held by said upper rail in a manner to be rotatable about its axis, said latch member being fixed to said control rod to rotate therewith,
   wherein when said upper rail is slid into said axially outermost position, the longer latch pawl is placed outside of an extreme end of said lock plate having the shorter latch pawl placed on a land portion of said lock plate, said longer latch pawl is so sized and constructed that when said upper rail is in said axially outermost position, a top portion of the longer latch pawl intersects with an imaginary plane which includes an outer surface of said lock plate.

4. A seat slide device as claimed in claim 3, in which said structure means comprises:
   a first projection formed on said lower rail;
   a second projection formed on said upper rail; and
   a roller rotatably disposed between said lower and upper rails within a range defined between said first and second projections, wherein when said upper rail assumes said axially outermost position, one of said first and second projections presses strongly said roller against the other of the projections.

5. A seat slide device as claimed in claim 2, in which said latch member is formed with three latch pawls, an outermost one of said latch pawls being longer than the other two.

6. A seat slide device as claimed in claim 2, further comprising biasing means which biases said control rod in a direction to achieve an engagement between said latch pawls of the latch member and the latch holes of the lock plate.

7. A seat slide device as claimed in claim 6, in which said biasing means comprises a coiled spring which is disposed about said control rod having one end hooked to said upper rail and the other end connected to said control rod.

8. A seat slide device for sliding a seat relative to a floor, comprising:
- a lower rail;
- an upper rail mounted on said lower rail;
- means for permitting said upper rail to slide relative to said lower rail;
- a structure means for allowing said upper rail to assume an axially outermost position relative to said lower rail, said axially outermost position being outside of a normal axially outermost position of said upper rail;
- a lock plate formed with a plurality of aligned latch holes and secured to said lower rail in such a manner that the latch holes are aligned in a sliding direction of said upper rail;
- a latch member connected to said upper rail, said latch member being formed with one longer latch pawl and at least one relatively shorter latch pawl which are latchingly engageable with the latch holes of said lock plate when said upper rail assumes a position other than said axially outermost and normal axially outermost positions; and
- means for permitting said latch member to move relative to said upper rail, wherein when said upper rail is slid into said axially outermost position, the longer latch pawl is placed outside of an extreme end of said lock plate having the shorter latch pawl placed on a land portion of said lock plate, said longer latch pawl is so sized and constructed that when said upper rail is in said axially outermost position, a top portion of the longer latch pawl intersects with an imaginary plane which includes an outer surface of said lock plate.

9. A seat slide device as claimed in claim 8, in which said structure means comprises:
- a first projection formed on said lower rail;
- a second projection formed on said upper rail; and
- a roller rotatably disposed between said lower and upper rails within a range defined between said first and second projections, wherein when said upper rail assumes said axially outermost position, one of said first and second projections presses strongly said roller against the other of the projections.

10. A seat slide device as claimed in which said latch member is formed with three latch pawls, an outermost one of said latch pawls being longer than the other two.

* * * * *